United States Patent Office 3,155,683
Patented Nov. 3, 1964

3,155,683
PREPARATION OF AROMATIC CYCLIC CARBONATES
Leroy S. Moody, Pittsfield, Mass., assignor to General Electric Company, a corporation of New York
No Drawing. Filed June 3, 1963, Ser. No. 284,809
8 Claims. (Cl. 260—340.2)

This invention relates to aromatic carbonates and more particularly is concerned with a novel and improved process for preparing cyclic aromatic carbonates.

Cyclic carbonates have been known and studied for many years since ethylene carbonate was first prepared by Newirowski in 1883 [J. Prakt. Chem. (2), 28, 439 (1883)]. This stable, crystalline solid has been definitely established to be the 5-membered ring compound. In 1898, Einhorn [Ann., 300, 135 (1898)] prepared a cyclic carbonate from catechol and phosgene. This simple 5-membered cyclic aryl carbonate and similar compounds prepared from substituted catechols are the only cyclic aryl carbonate monomers reported in the literature. They are, however, highly stable compounds incapable of being polymerized to form high molecular weight polycarbonates. In 1930, Carothers and van Natta [JACS, 52, 314–26 (1930)] prepared the 6-membered cyclic trimethylene carbonate and succeeded in isolating the cyclic dimeric tetramethylene carbonate. This work was continued by Carothers, Dorough and van Natta [JACS, 54, 761–772 (1932)] in a study for the reversible polymerization of 6-membered cyclic esters, including cyclic alphatic carbonates. They had concluded at the time that any attempt to prepare cyclic esters having more than 6 atoms in the ring from open chain polymeric compounds led to linear polymers. In 1933, Hill and Carothers [JACS, 55, 5031–39 (1933)] succeeded in preparing many cyclic aliphatic carbonates by depolymerizing the corresponding polymers under a vacuum. However, they were unable to prepare any monomeric cyclic carbonates having 7 or 8 atoms in the ring by their depolymerization technique. The preparation of cyclic tetrameric carbonates by condensing p-hydroxy bis-phenols with their chloroformate derivatives is described by Schnell and Bottenbruch in "Die makromolekulare Chemie," 57, 1–11 (1962). However, the tetramers are the only cyclic carbonate materials reported by the authors who state that they were unable to prepare any monomeric or dimeric cyclic aromatic carbonates.

In copending application Serial No. 161,306, filed December 21, 1961, and assigned to the same assignee as the present invention, there is disclosed a new class of aromatic cyclic carbonate monomers corresponding to the formula (I)

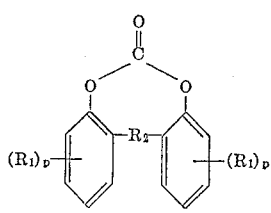

where $R_1$ is selected from the class consisting of halogen, such as chlorine and bromine; and alkyl radicals such as, for example, methyl, ethyl, propyl, butyl, p-tert-butyl; and $R_2$ is an alkylidene group such as, for example, methylene, ethylidene, and propylidene; and $p$ is a whole number from 0 to 2. Such aromatic cyclic carbonate monomers may be easily and conveniently converted to high molecular weight carbonate polymers by heating these cyclic monomers in the presence of a catalyst, such as an alkali metal or an alkali metal hydroxide, for example. Other suitable catalysts which may be used, as well as specific methods for polymerizing these aromatic cyclic carbonate monomers to provide high molecular weight aromatic polymers, are disclosed in the above referred to copending application.

In copending application Serial No. 247,292, filed December 26, 1962, and also assigned to the same assignee as the present invention, there is disclosed a new class of novel and useful cyclic aromatic carbonate polymers corresponding to the general formula (II)

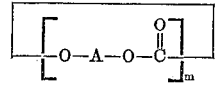

where $m$ is a whole number from 2 to 3, —A— is

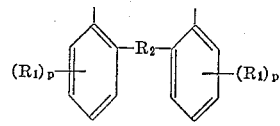

when $m$ is 2; and —A— is

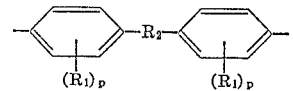

when $m$ is 3; and $R_1$, $R_2$ and $p$ have the meanings given above.

Such cyclic carbonate polymers may be prepared by contacting, in the presence of an acid acceptor, a dihydric phenol selected from the class consisting of

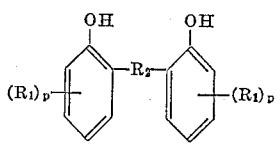

and

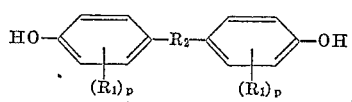

wherein $R_1$, $R_2$ and $p$ have the meanings given above, with a carbonyl halide to provide a reaction mixture containing cyclic carbonate polymers of Formula II above, and separating the cyclic carbonate polymer from the reaction mixture.

I have now discovered a new and improved process for preparing both the cyclic carbonate monomers of Formula I as well as the cyclic carbonate polymers of Formula II. Briefly stated, the process of my invention comprises reacting together, in an inert organic solvent containing an acid acceptor and as the sole reactive ingredients, water and a bishaloformate selected from the class consisting of (III)

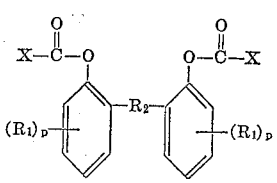

and (IV)

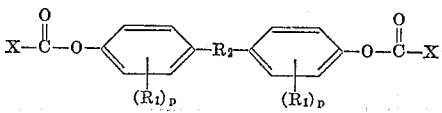

to provide a reaction mixture containing cyclic carbonate of the formula

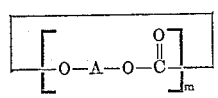

where X is halogen, such as chlorine or bromine, for example; $m$ is a whole number from 1 to 3; —A— is

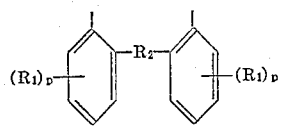

wherein $m$ is from 1 to 2 and —A— is

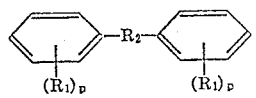

where $m$ is 3; $R_1$ is selected from the class consisting of halogen and alkyl; $R_2$ is an alkylidene group; and $p$ is a whole number from 0 to 2; and separating the cyclic carbonate from the reaction mixture.

The bishaloformates employed in the preparation of the cyclic carbonates in accordance with the present invention may be the bischloroformates or the bisbromoformates falling within the scope of Formulas III and IV. The bischloroformates are generally preferred since they may be prepared easily by reacting the corresponding dihydric phenols with phosgene. For example, the bischloroformate of 2,2 bis-(4-hydroxyphenyl) propane may conveniently be obtained by reacting that compound with phosgene as described in British Patent 613,280.

The process of the present invention may be successfully carried out at temperatures ranging from values below about —10° C. to values above about 75°. However, higher yields of the desired cyclic product may be obtained by maintaining the temperature of reaction below the reflux temperature (at atmospheric pressure) of the reaction mixture, and preferably below 20° C.

In general, any acid acceptor, whether organic or inorganic in nature, may be employed in the practice of the process of the present invention. Included among the inorganic acid acceptors which may be used are the alkali and alkaline earth metal oxides and hydroxides, such as, for example, the oxides and hydroxides of sodium, calcium and barium. The organic acid acceptors which may be used are the tertiary amines, such as the aliphatic tertiary amines, as, for instance, trimethylamine; triethylamine; tripropylamine; as well as aromatic tertiary amines such as triphenylamine; N,N dimethylaniline; and N,N dimethyl-p-nitroaniline. Included also are the heterocyclic tertiary amines such as, for example, pyridine, picoline, pyridazine, pyridimine, pyrazine, quinoline and isoquinoline.

I have discovered that particularly good yields of the cyclic carbonate monomer and the cyclic carbonate trimer may be obtained when a weak base, such as a tertiary amine, is used as the acid acceptor in the process of the invention. On the other hand, should a cyclic carbonate dimer be desired, I have found it preferable to employ a strong base, such as sodium hydroxide, for example, as the acid acceptor.

The molar quantity of water used should be substantially equal to the molar quantity of bishaloformate to be converted. Theoretically, one mole of water reacts with one mole of bishaloformate to produce the cyclic carbonate monomer or the recurring unit of the cyclic carbonate, and two moles of the corresponding halo acid. The two moles of the halo acid are in turn "attached" by two moles of tertiary amine.

Any organic solvent inert in the sense that it does not enter into the reaction between the water and the bishaloformate to be reacted may be employed in the practice of the invention. Examples of suitable solvents are methyl-ene chloride, ethylene dichloride, propylene dichloride and chlorobenzene. In general, I have found that higher yields of the desired cyclic carbonate may be obtained when the weight ratio of the bishaloformate to be reacted to the organic solvent employed is less than 0.2, and preferably less than 0.05.

In the case where the bishaloformate employed in the process of the invention conforms to the formula

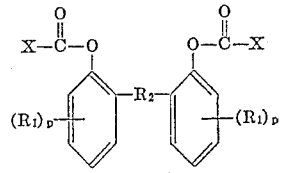

where X, $R_1$, $R_2$ and $p$ all have the meanings given above, I have found that the reaction mixture at the termination of the reaction may contain (1) a cyclic carbonate monomer of the formula

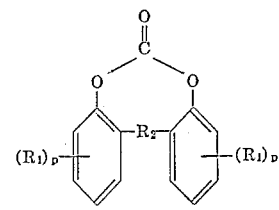

(2) a cyclic carbonate dimer of the formula

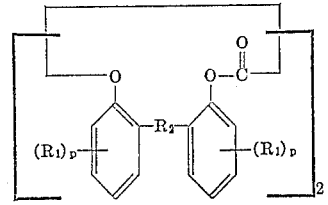

as well as (3) a linear polymer containing recurring structural units of the formula

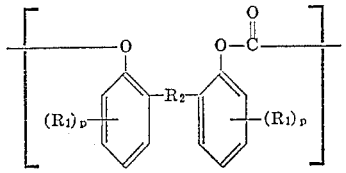

Separation of the cyclic monomer and dimer from this reaction mixture may be accomplished in any number of ways, as for example, by treating the reaction mixture with an inert organic solvent in which the cyclic dimer and monomer are soluble, but in which the linear polymer is insoluble. Examples of suitable solvents for use in this connection are acetone, diethylether and carbon disulfide. Addition of such solvents to the reaction mixture will cause the linear polymer to precipitate from the solution containing the monomer and dimer. The resulting solution may be separated from the solid linear polymer by filtration, or centrifugation, for example. The monomer and dimer may then be removed from solution by evaporating the solvent, for instance, to provide a solid mixture of the cyclic materials. Subsequently, the dimer may be isolated from the monomer by gradually heating the solid mixture under vacuum at a temperature of from about 90° C. to about 150° C. to sublime the monomeric carbonate. The resulting sublimation residue, which is substantially nonvolatile under these conditions, comprises the desired impure cyclic carbonate dimer, and the sublimate comprises the desired monomeric carbonate.

Alternatively, the cyclic monomer and dimer may be separated from the reaction mixture by simply evaporating the reaction mixture to dryness and extracting the cyclic carbonates (monomer and dimer) from the solid residue with any one of the above solvents in which the cyclic materials are soluble but in which the linear polymer is insoluble. The resulting solution of the cyclic materials may then be evaporated to dryness and the dimer isolated from the monomer by sublimation.

In the case where a cyclic trimeric carbonate is prepared, i.e., where the bishaloformate employed in the process of the invention conforms to the formula

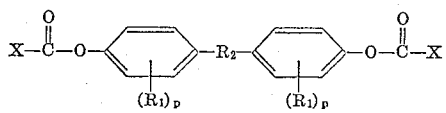

where X, $R_1$, $R_2$ and $p$ all have the meanings given above, I have found that the reaction mixture at the termination of the reaction may contain, in addition to the desired cyclic trimer, a linear polymer containing recurring structural units of the formula

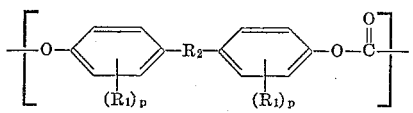

Separation of the trimer from the reaction mixture may be accomplished in a number of ways as, for example, by treating the reaction mixture with an inert organic solvent in which the cyclic trimer is soluble but in which the linear polymer is insoluble. Generally speaking, the solvents employed in this capacity may be the same solvents used in the separation of the cyclic monomers and dimers from the reaction mixture as mentioned above. As in the case of the cyclic monomer and dimer separation, addition of such an organic solvent to the reaction mixture will cause the linear polymer to precipitate. The resulting solution may then be separated from the solid linear polymer (as by filtration or centrifugation, for example) and the cyclic carbonate trimer isolated from the solution by evaporation of the solvent to provide a solid residue comprising the cyclic trimeric carbonate material.

As will be appreciated by those skilled in the art, the cyclic trimeric carbonate may also be separated from the reaction mixture by evaporating the reaction mixture to dryness, and extracting the cyclic trimeric carbonate with any of the aforementioned solvents in which the trimer is soluble but in which the linear polymer is insoluble. Isolation of the cyclic trimer from solution may then be accomplished by evaporation of the solvent to provide a solid residue of the cyclic trimeric carbonate material.

The cyclic aromatic carbonates prepared by the process of the invention may be polymerized to provide linear, high molecular weight aromatic polycarbonate resins of the type which have achieved wide acceptance in the plastics industry. Such linear high molecular weight polymers may be prepared by heating the cyclic aromatic carbonates of Formula II for a period of time, varying inversely with the temperature, until a high molecular weight linear polymer is produced. A catalytic amount of a basic material may be added to accelerate the speed of the polymerization and to reduce the temperature at which the polymerization is initiated. Such addition of catalyst is by no means necessary, however, since unless active means are taken to (1) completely sterilize the equipment in which the cyclic materials are heated (as, for example, glass or metal beakers), (2) purify the cyclic material by repeated recrystallization techniques, and (3) conduct the polymerization in a closed system, i.e., in an inert atmosphere, the presence of even minute amounts of any impurity (such as traces of atmospheric moisture, unreacted bisphenol occluded to the surface of the cyclic material, or even the base or metal oxide present on the surface of the vessel in which polymerization is to be effected) will be sufficient to initiate the polymerization of the cyclic materials.

Examples of the basic materials which may be used to increase the rate at which polymerization may be initiated are the alkali metals, such as sodium, potassium, rubidium, cesium; alkali metal hydroxides, such as sodium hydroxide, potassium hydroxide; alkali metal carbonates, such as sodium carbonate, potassium carbonate; alkali metal alkoxides, such as sodium methoxide, potassium ethoxide; alkali metal aryloxides, such as sodium phenate, dipotassium bisphenate; quaternary ammonium hydroxides, such as tetramethylammonium hydroxide, cetyl triethylammonium hydroxide, tetra n-heptyl ammonium hydroxide, tetraethyl ammonium hydroxide, organometallics such as phenyl lithium, butyl lithium, and Grignard reagents, such as phenyl magnesium bromide.

In general, the polymerization of the cyclic carbonate monomers, dimers and trimers to linear aromatic carbonate polymers may be conducted either in a fusion cook or in a solvent system. As will be apprepreciated by those skilled in the art, it is possible to employ a cyclic dimer and trimer in combination with one another, or in combination with one or more different aromatic cyclic monomers of the type falling within the scope of Formula I above (in either polymerization technique) in the event a carbonate copolymer rather than a homopolymer is desired.

In the event the fusion cook technique is employed, temperatures as high as 350° C. may be required to initiate thte polymerization reaction, depending upon the particular cyclic carbonate and catalyst that are used. On the other hand, should the reaction be conducted in a solvent system, polymerization may be successfully initiated at temperatures as low as room temperature (25° C.) or lower, although temperatures ranging from room temperature to the temperature at which the solvent refluxes (at atmospheric pressure) are generally preferred, since the maximum degree of polymerization of the cyclic carbonates into linear form has been found to occur within that temperature range.

The reaction time at any given temperature will vary with each particular cyclic carbonate, the type and amount of catalyst, if any, that is used, and the amount, if any, of solvent present. Generally speaking, the polymerization reaction is permitted to continue at a fixed temperature until the viscosity of the resulting polymer or polymer solution reaches a maximum, thus insuring as complete a degree of polymerization as possible. In the case of the fusion cook, heating for a period of from a few minutes to a few hours will often suffice, and the increase in viscosity may be observed visually. Should a solvent system be employed the viscosity of the polymer will reach a specific maximum after a period of time which may be from but a few minutes to several hours, depending again upon the specific cyclic carbonate used and the amount of solvent and catalyst employed. Continued heating of the formed polymer after the maximum viscosity is attained will only tend to decrease this value. The period of heating any given cyclic at a fixed temperature until this maximum is reached may be ascertained easily by periodic tests made on the viscosity of the polymer formed. Generally, a period of heating of from less than one hour to four hours or more will be sufficient to achieve this maximum value.

Any organic solvent, inert in the sense that it does not enter into the polymerization reaction and preferably one in which the resulting linear polymer is soluble, may be employed. Examples of suitable solvents are: chlorinated biphenyls containing from 1 to 10 chlorine atoms on the aryl nucleus; chlorinated diphenyl ethers containing from 1 to 10 chlorine atoms on the aryl nucleus; diphenyl ether, ethylene dichloride, propylene dichloride, chlorobenzene, chloroform, pyridine, and methylene chloride. The catalytic amount (i.e., the amount sufficient to initiate polymerization) of catalyst used may also vary within a wide range, depending upon the temperature of reaction, the amount of solvent employed, and the particular cyclic carbonate which is to be polymerized. Satisfactory results have been obtained by employing as little as 0.001 percent by weight of the catalyst, based upon the weight of the cyclic carbonate to be polymerized. Generally, however, amounts varying from 0.01 percent to about 3 percent by weight are advantageously used. Although the catalyst may be added in amounts greater than 3 percent, such addition is neither necessary nor practical, since it tends to reduce the molecular weight of the polymer formed and to contaminate the resin product which is obtained. As will be appreciated by those skilled in the art, molecular weight regulators may be added to the cyclic dimer or trimer in either polymerization technique. Examples of such regulators are monofunctional phenols, i.e., phenol p-tertiary butyl phenol; monofunctional organic acids, i.e., benzoic acid, acetic acid; and monofunctional alcohols, i.e., methanol, ethanol.

In order that those skilled in the art may better understand how the present invention may be practiced, the following examples are given by way of illustration and not by way of limitation. All parts and percentages are by weight unless otherwise noted. Values within ± 10 percent of the calculated molecular weight of any particular cyclic carbonate were deemed to be within the acceptable range of experimental error involved in such molecular weight determinations.

*Example 1*

This example illustrates the preparation of a bishaloformate of a dihydric phenol of the type employed in the practice of the invention.

91.2 parts of 2,2'-dihydroxy-5,5'-dimethyldiphenyl methane were dissolved in 350 parts of toluene and 119 parts of phosgene were bubbled into the solution which was maintained at 5–8° C. After the phosgene addition was complete, the temperature was lowered to −10° C. and 97.4 parts of dimethylaniline dissolved in an equal weight of toluene were added dropwise with stirring over a period of 65 minutes. Stirring was maintained for an additional two hours and the reaction mixture allowed to stand overnight. The toluene solution was washed twice with dilute hydrochloric acid and three times with water to remove dimethylaniline and dimethylaniline hydrochloride. The toluene solution was then dried over anhydrous magnesium sulfate and the solution distilled off under reduced pressure. When the volume of solution was about one quarter of its original volume, it was cooled to yield a needlelike crystalline solid. This solid was recrystallized twice from heptane, melting point 65–67° C., and was identified as the bischloroformate of 2,2'-dihydroxy-5,5'-dimethyldiphenylmethane.

*Example 2*

This example illustrates the preparation of a cyclic carbonate monomer and cyclic carbonate dimer by the process of the invention.

A mixture of 300 parts of methylene chloride and 35.3 parts of the bischloroformate of 2,2'-dihydroxy-5,5'-dimethyldiphenylmethane was added dropwise with stirring to a vessel containing a mixture of 1.8 parts water, 15.8 parts pyridine and 3177 parts of methylene chloride over a 1¼ hour period. The methylene chloride solution was washed with dilute hydrochloric acid and water and dried over anhydrous magnesium sulfate. Evaporation of methylene chloride yielded a fine white powder. This powder was recrystallized three times from carbon tetrachloride to yield 12 parts of a white crystalline solid. This crystalline solid was sublimed under reduced pressure to yield a white crystalline sublimate, melting point 144–146° C., which was shown by infrared analysis and mixed melting point to be identical with the structure of the monomeric cyclic carbonate.

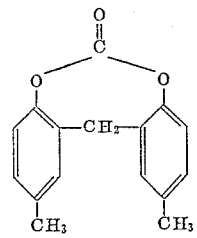

|  | Found | Calculated |
| --- | --- | --- |
| Carbon (Percent) | 75.57 | 75.57 |
| Hydrogen (Percent) | 5.73 | 5.55 |
| Molecular Weight | 236 | 254 |

The sublimation residue after all the monomeric cyclic carbonate was removed was a white crystalline solid, melting point 276–279° C., which was shown by infrared analysis and mixed melting point to be identical with the structure of the dimeric cyclic carbonate.

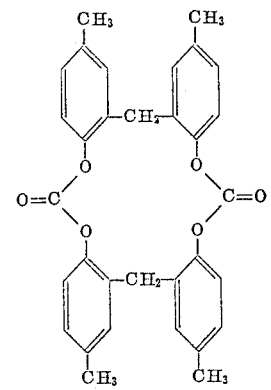

|  | Found | Calculated |
| --- | --- | --- |
| Carbon (Percent) | 75.78 | 75.57 |
| Hydrogen (Percent) | 5.68 | 5.55 |
| Molecular Weight | 542 | 508 |

*Example 3*

This example illustrates the preparation of the cyclic carbonate monomer at elevated temperatures.

A solution of 800 parts chlorobenzene, 3.8 parts pyridine and 0.37 part water, were heated to 81° C. A solution of 8.5 parts of the bischloroformate of 2,2'-dihydroxy-5,5'-dimethyldiphenylmethane in 50 parts chlorobenzene also heated to 81° C. was added dropwise with stirring to the former solution over a period of 1¼ hours. After standing overnight, the reaction mixture was washed with dilute hydrochloric acid and water, and dried over anhydrous MgSO₄. The chlorobenzene was distilled off under reduced pressure to yield a powder. This powder was sublimed under reduced pressure to yield all monomeric cyclic carbonate (and no dimeric cyclic carbonate) as described in Example 2.

*Example 4*

This example illustrates the preparation of the cyclic carbonate dimer in the presence of a strong base.

A solution of 17.7 parts of the bischloroformate of 2,2'-dihydroxy-5,5'-dimethyldiphenylmethane in 270 parts methylene chloride was added dropwise with stirring over a 2¼ hour period to a dispersion of 4 parts of powdered sodium hydroxide in 1500 parts methylene chloride containing 0.9 part water.

The reaction mixture was washed with dilute hydrochloric acid and water and dried over anhydrous MgSO₄. The methylene chloride was evaporated to yield a semicrystalline solid mass. This material was recrystallized once from carbon tetrachloride and twice from benzene to yield a white crystalline solid, melting point 276–279° C., which was shown to be identical to the cyclic dimeric carbonate described in Example 2 by infrared analysis and mixed melting point determination.

*Example 5*

This example illustrates the preparation of a cyclic trimeric carbonate by the process of the invention.

A mixture consisting of 300 parts of methylene chloride and 35.3 parts of the bischloroformate of 2,2-bis-(4-hydroxyphenyl) propane were added dropwise with stirring to a vessel containing a mixture of 1.8 parts water, 15.8 parts of pyridine and 3,177 parts of methylene chloride, over a 1¾ hour period. The methylene chloride solution was then washed with dilute hydrochloric acid and water and dried over anhydrous magnesium sulfate. Evaporation of the methylene chloride yielded a semisolid which was redissolved in methylene chloride and precipitated with pertoleum ether. After filtering off the polymer, the precipitation liquor was evaporated to dryness to yield a granular solid. This solid was recrystallized twice from carbon tetrachloride to yield a crystalline solid having a melting point over 280° C. and yielding an X-ray diffraction pattern identical to that found for the cyclic trimeric carbonate of the structure indicated below.

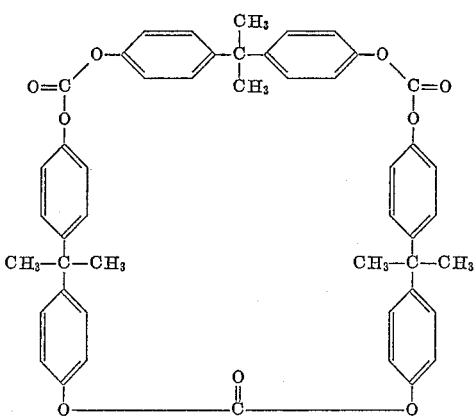

*Example 6*

This example illustrates the preparation of a linear polycarbonate resin by polymerizing a cyclic carbonate monomer of the type prepared by the process of the invention.

A minute quantity $K_2CO_3$ was added to a molten sample of cyclic 2,2'-(5,5'-dimethyldiphenylmethane) carbonate. The viscosity of the melt increased rapidly with no apparent change in color. After a few minutes, the viscous mass was cooled with no evidence of crystallization, and the reduced viscosity of the resin in dioxane at 30° C. (0.4 g./100 ml. concentration) was found to be 0.53.

*Example 7*

This example illustrates the preparation of a linear polycarbonate resin by polymerizing a cyclic carbonate monomer (of the type prepared by the process of the invention) in a solvent system.

0.25 part cyclic 2,2'-(5,5'-dimethyldiphenylmethane) carbonate was dissolved in 3 parts chlorobenzene at 110° C. in a silicone oil bath. A small quantity of anhydrous potassium carbonate was introduced and after the immediate viscosity buildup (15–30 seconds) the viscous solution was poured into a large excess of methyl alcohol. After several washes with methyl alcohol, the white fibrous precipitate was dried, dissolved in methylene chloride and cast into a clear, tough, flexible film. The reduced viscosity of this polymer in dioxane at 30° C. (0.4 g./100 ml. concentration) was determined to be 0.58. The cast film was found to have a tensile strength of 6,000 p.s.i. and an elongation of 2–3 percent, as measured on the Instron. The softening temperature of the polymer was 170–180° C.

*Example 8*

This example illustrates the preparation of a linear polycarbonate resin by polymerizing a cyclic dimeric carbonate of the type prepared by the process of the invention.

0.25 part of the cyclic dimeric carbonate of 2,2'-dihydroxy-5,5'-dimethyldiphenylmethane was placed in a glass tube and melted to a clear light yellow liquid in a bath maintained at 280° C. When the tube was removed from the bath and allowed to cool, the melt crystallized with no evidence of polymer formation. When the tube was replaced in the hot bath the dimer remelted. A minute quantity of anhydrous potassium carbonate (approximately 0.001 percent) was introduced to the hot melt and a dramatic change was noted. The fluid gradually increased in viscosity and after 15 minutes heating was quite viscous so that fibers could be drawn from the melt. The viscous polymer was allowed to cool and dissolved in methylene chloride. Part of the methylene chloride solution was precipitated in methanol to yield a fibrous polymer and parts cast on a glass plate to yield a clear, flexible film.

*Example 9*

This example illustrates the production of a linear, high molecular weight polycarbonate resin by polymerizing a cyclic trimeric carbonate of the type prepared by the process of the invention.

One gram of the cyclic trimeric carbonate of 2,2-(4,4'-dihydroxydiphenyl) propane was piled in the center of a small aluminum weighing cup and placed on the hot plate with a surface temperature of 600° F. The surface temperature was raised gradually to 660° F. over a 10 minute period and the pile of solid trimer melted completely to a clear yellow viscous liquid. As soon as the crystalline solid was completely melted, the cup was removed from the hotplate and allowed to cool. On cooling the melt remained clear and became tough and ductile. It was soluble in methylene chloride and after precipitation from solution with acetone the dried polymer was found to have a reduced viscosity of 1.84 at 30° C. in dioxane at 0.4 g./100 ml. concentration. A methylene chloride solution of this polymer was cast into a clear, tough film. The infrared analysis of this polymer showed it to be essentially identical to the linear polymer obtained from the direct phosgenation of 2,2-(4,4'-dihydroxydiphenyl) propane in methylene chloride-pyridine solution.

From the foregoing examples it will be appreciated that the present invention provides a novel and improved process for preparing cyclic aromatic carbonates which are useful in the production of linear, high molecular weight, aromatic polycarbonate resins. Since the polymerization of the cyclic carbonates to form high molecular weight linear carbonate resins neither requires the use of a toxic carbonate halide nor results in the evolution of a corrosive gas (HCl), the polycarbonate resins may be polymerized from the cyclic carbonates at their place of use. Accordingly, large and intricate castings of linear polycarbonate resin may be prepared by polymerizing the cyclic carbonates in situ at the particular installation requiring such resin castings. In addition, the cyclic carbonates prepared by the process of the invention may be employed as potting compounds and in the production of coatings and films by in situ polymerization techniques.

The polycarbonate resins prepared from the cyclic carbonates of the invention have utility in the same applications as previously known aromatic carbonate polymers. For example, they are useful in the manufacture of films, fibers, molded or extruded parts, and in the preparation of surface coatings for use in structural, decorative and electrical applications.

What I claim as new and desire to secure by Letters Patent of the United States is:

1. A process for preparing a cyclic aromatic carbonate which comprises reacting together in an inert organic solvent containing an acid acceptor, and as the sole reactive ingredients, water and a bishaloformate selected from the class consisting of

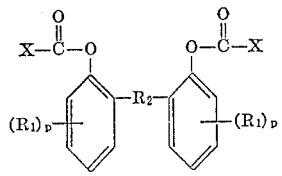

and

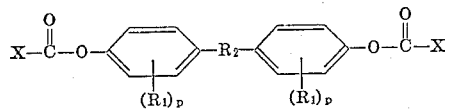

to provide a reaction mixture containing a cyclic carbonate of the formula

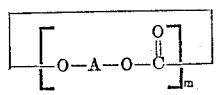

where $m$ is a whole number from 1 to 3; —A— is

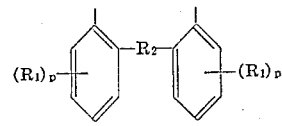

when $m$ is from 1 to 2 and —A— is

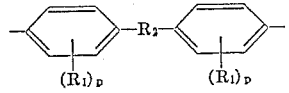

when $m$ is 3, X is halogen; $R_1$ is selected from the class consisting of halogen and alkyl; $R_2$ is an alkylidene group; and $p$ is a whole number from 0 to 2, and separating the cyclic carbonate from the reaction mixture.

2. The process of claim 1 in which the bishaloformate is

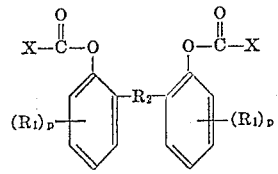

where X is halogen; $R_1$ is selected from the class consisting of halogen and alkyl; $R_2$ is an alkylidene group; and $p$ is a whole number from 0 to 2.

3. The process of claim 1 in which the bishaloformate is

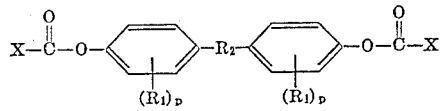

where X is halogen; $R_1$ is selected from the class consisting of halogen and alkyl; $R_2$ is an alkylidene group; and $p$ is a whole number from 0 to 2.

4. The process of claim 1 in which the bishaloformate is

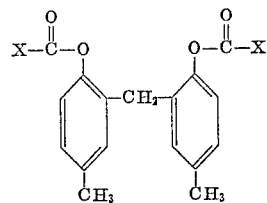

where X is halogen.

5. The process of claim 1 in which the bishaloformate is

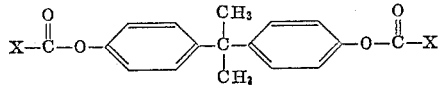

where X is halogen.

6. The process of claim 1 in which the acid acceptor is pyridine.

7. The process of claim 1 in which the bishaloformate is a bischloroformate.

8. The process of claim 1 in which the inert organic solvent is methylene chloride.

References Cited in the file of this patent

FOREIGN PATENTS 772,627    Great Britain _____ Apr. 17, 1957

OTHER REFERENCES

Schnell et al.: Makromolekulare Chemie, vol. 57, pp. 1–11 (1962).